United States Patent
Wang et al.

(10) Patent No.: US 8,638,744 B2
(45) Date of Patent: Jan. 28, 2014

(54) CHANNEL INTERFERENCE MITIGATION METHOD, APPARATUS, AND SYSTEM FOR PERFORMING CHANNEL COMPENSATION TO OBTAIN ANOTHER CHANNEL ACCORDING TO RECEIVED ADJUSTMENT PARAMETERS

(71) Applicant: Huawei Technologies Co., Ltd., Shenzhen (CN)

(72) Inventors: Rui Wang, Shenzhen (CN); Hong Cheng, Shenzhen (CN); Yinggang Du, Kista (SE)

(73) Assignee: Huawei Technologies Co. Ltd., Shenzhen (CN)

( * ) Notice: Subject to any disclaimer, the term of this patent is extended or adjusted under 35 U.S.C. 154(b) by 0 days.

(21) Appl. No.: 13/835,751

(22) Filed: Mar. 15, 2013

(65) Prior Publication Data
US 2013/0201950 A1     Aug. 8, 2013

Related U.S. Application Data

(63) Continuation of application No. PCT/CN2011/073998, filed on May 12, 2011.

(30) Foreign Application Priority Data

Sep. 15, 2010 (CN) .......................... 2010 1 0284594

(51) Int. Cl.
*H04W 4/00* (2009.01)
(52) U.S. Cl.
USPC ........................................... 370/329
(58) Field of Classification Search
USPC .................................. 370/329; 455/450, 464
See application file for complete search history.

(56) References Cited

U.S. PATENT DOCUMENTS

| 2004/0048619 A1 | 3/2004 | Kim et al. |
| 2010/0067469 A1 | 3/2010 | Gaal et al. |

(Continued)

FOREIGN PATENT DOCUMENTS

| CN | 1496158 A | 5/2004 |
| CN | 1917498 A | 2/2007 |

(Continued)

OTHER PUBLICATIONS

Alcatel-Lucent Shanghai Bell, "HetNet Rel-8/9 Data Channel Performance," 3GPP TSG RAN WG1 Meeting #61, R1-102806, Montreal, Canada, May 10-14, 2010, 2 pages.

(Continued)

*Primary Examiner* — Dang T Ton
*Assistant Examiner* — Kevin Lee
(74) *Attorney, Agent, or Firm* — Slater & Matsil, L.L.P.

(57) ABSTRACT

Embodiments of the present invention provide a data transmission processing method, apparatus, and system. The method includes: receiving, by a first base station, an adjustment parameter transmitted by a terminal, where the adjustment parameter is obtained by the terminal according to reference signals separately transmitted by the first base station and a second base station; performing, by the first base station and according to the adjustment parameter, channel compensation on a first channel between the first base station and the terminal to obtain a second channel; and transmitting, by the first base station, a first signal over the second channel to the terminal, so that the terminal obtains the first signal from a mixed signal of the first signal and a second signal that is transmitted by the second base station.

21 Claims, 8 Drawing Sheets

(56) References Cited

U.S. PATENT DOCUMENTS

| | | | |
|---|---|---|---|
| 2010/0075694 A1 | 3/2010 | Damnjanovic et al. | |
| 2011/0200134 A1* | 8/2011 | Khan | 375/267 |
| 2011/0206105 A1 | 8/2011 | Lin et al. | |
| 2011/0217985 A1* | 9/2011 | Gorokhov | 455/452.2 |
| 2012/0106465 A1* | 5/2012 | Haghighat et al. | 370/329 |

FOREIGN PATENT DOCUMENTS

| | | |
|---|---|---|
| EP | 2244399 A1 | 10/2010 |
| EP | 2352247 A1 | 8/2011 |
| WO | 2009098880 A1 | 8/2009 |
| WO | 2010024556 A2 | 3/2010 |
| WO | 2010061724 A1 | 6/2010 |
| WO | WO 2010/061532 A1 | 6/2010 |

OTHER PUBLICATIONS

International Search Report received in International Application No. PCT/CN2011/073998, Applicant: Huawei Technologies Co., Ltd. et al., mailed Aug. 18, 2011, 3 pages.

Written Opinion of the International Searching Authority received in International Application No. PCT/CN2011/073998, Applicant: Huawei Technologies Co., Ltd. et al., mailed Aug. 18, 2011, 3 pages.

ZTE, "Downlink data channel performance of interference management for Macro + outdoor hotzones," 3GPP TSG-RAN WG1 Meeting #61, R1-103214, Montreal, Canada, May 10-14, 2010, 7 pages.

Extended European Search Report for Application No. 11824475.5-1851, mailed Aug. 27, 2013, 6 pages.

\* cited by examiner

CHANNEL INTERFERENCE MITIGATION METHOD, APPARATUS, AND SYSTEM FOR PERFORMING CHANNEL COMPENSATION TO OBTAIN ANOTHER CHANNEL ACCORDING TO RECEIVED ADJUSTMENT PARAMETERS

CROSS-REFERENCE TO RELATED APPLICATIONS

This application is a continuation of International Application No. PCT/CN2011/073998, filed on May 12, 2011, which claims priority to Chinese Patent Application No. 201010284594.5, filed on Sep. 15, 2010, both of which are hereby incorporated by reference in their entireties.

TECHNICAL FIELD

The present invention relates to the field of communications technologies, and in particular, to a data transmission processing method, apparatus, and system.

BACKGROUND

A heterogeneous network (Heterogeneous Network, HetNet for short) is capable of effectively enhancing throughput of a current network system, and has become a focus of discussion in the 3GPP standard.

FIG. 1 is a schematic diagram of a heterogeneous network in the prior art. As shown in FIG. 1, the HetNet may include a macro base station (Macro eNB) and multiple pico base stations (Pico eNB). The Macro eNB covers a large macrocell (macrocell). In a hot spot area (that is, an area with a high communication demand), multiple Pico eNBs are deployed as required. Each Pico eNB covers a small picocell (picocell). Each picocells are far from another. Therefore, the multiple Pico eNBs may use a same spectrum without the need of considering a problem of interference on each other. From the perspective of the whole macrocell, one spectrum may be reused by multiple Pico eNBs, so that spectrum utilization rate is high and system throughput is high.

However, in the HetNet, the transmit power of the Macro eNB is generally over 10 dB (dB) higher than the transmit power of the Pico eNB. Therefore, for a Pico eNB closer to the Macro eNB, when the Pico eNB uses a same downlink spectrum as the Macro eNB, a terminal corresponding to the Pico eNB, when receiving signals transmitted by the Pico eNB, may suffer strong interference caused by a signal transmitted by the Macro eNB. To overcome the interference, in the prior art, the downlink spectrum used by the Pico eNB is generally controlled, so that the downlink spectrum used by the Pico eNB different from that used by the Macro eNB. Consequently, the Macro eNB and the Pico eNB are capable of using only part of spectrum resources, which thereby leading to low system throughput.

SUMMARY OF THE INVENTION

Embodiments of the present invention provides a data transmission processing method, apparatus, and system, so that a macro base station and a pico base station in a heterogeneous network can use a same spectrum, and system throughput is improved.

An embodiment of the present invention provides a data transmission processing method, where the method includes receiving, by a first base station, an adjustment parameter transmitted by a terminal, where the adjustment parameter is obtained by the terminal according to reference signals separately transmitted by the first base station and a second base station, performing, by the first base station and according to the adjustment parameter, channel compensation on a first channel between the first base station and the terminal to obtain a second channel, and transmitting, by the first base station, a first signal over the second channel to the terminal, so that the terminal obtains the first signal from a mixed signal of the first signal and a second signal that is transmitted by the second base station, where the first signal and the second signal are transmitted by the first base station and the second base station using a same spectrum to the terminal, respectively.

An embodiment of the present invention provides a data transmission processing method, where the method includes obtaining, by a terminal, an adjustment parameter according to reference signals separately transmitted by a first base station and a second base station, transmitting, by the terminal, the adjustment parameter to the first base station, so that the first base station performs, according to the adjustment parameter, channel compensation on a first channel between the first base station and the terminal to obtain a second channel, receiving, by the terminal, a mixed signal of a first signal transmitted by the first base station over the second channel and a second signal transmitted by the second base station, and obtaining, by the terminal, the first signal from the mixed signal; where the first signal and the second signal are transmitted by the first base station and the second base station using a same spectrum to the terminal, respectively.

An embodiment of the present invention provides a base station, including a receiving module, configured to receive an adjustment parameter obtained by a terminal according to reference signals separately transmitted by a first base station and a second base station; where the base station is the first base station, a channel compensating module, configured to perform, according to the adjustment parameter, channel compensation on a first channel between the first base station and the terminal to obtain a second channel, and a transmitting module, configured to transmit a first signal over the second channel to the terminal so that the terminal obtains the first signal from a mixed signal of the first signal and a second signal that is transmitted by the second base station; where the first signal and the second signal are transmitted by the first base station and the second base station using a same spectrum to the terminal, respectively.

An embodiment of the present invention provides a terminal, including an obtaining module, configured to obtain an adjustment parameter according to reference signals separately transmitted by a first base station and a second base station, a transmitting module, configured to transmit the adjustment parameter to the first base station, so that the first base station performs, according to the adjustment parameter, channel compensation on a first channel between the first base station and the terminal to obtain a second channel, a receiving module, configured to receive a mixed signal of a first signal transmitted by the first base station over the second channel and a second signal transmitted by the second base station, and a processing module, configured to obtain the first signal from the mixed signal; where the first signal and the second signal are transmitted by the first base station and the second base station using a same spectrum to the terminal, respectively.

An embodiment of the present invention provides a data transmission processing system, including any base station provided in the embodiments of the present invention, and any terminal provided in the embodiments of the present invention.

In the data transmission processing method, apparatus, and system provided in the embodiments of the present invention, the terminal obtains the adjustment parameter according the reference signals of the first base station and the second base station. The first base station performs, according to the adjustment parameter obtained by the terminal, channel compensation on the first channel between the first base station and the terminal to obtain the second channel, and transmits the first signal to the terminal over the second channel so that the terminal may obtain the first signal from the mixed signal of the first signal and the second signal that is transmitted by the second base station using the same spectrum as that of the first signal. In this way, the first base station and the second base station may use the same spectrum to transmit signals, which improves system throughput.

BRIEF DESCRIPTION OF THE DRAWINGS

To illustrate technical solutions provided in embodiments of the present invention or the prior art more clearly, accompanying drawings required to be used in the description of the embodiments of the present invention or the prior art are briefly introduced in the following. Apparently, the accompanying drawings are some embodiments of the present invention, and persons of ordinary skill in the art may derive other drawings from these accompanying drawings without making creative efforts.

DETAILED DESCRIPTION OF ILLUSTRATIVE EMBODIMENTS

In order to make objectives, technical solutions, and advantages of the present invention clearer, technical solutions according to embodiments of the present invention are clearly and completely described in the following with reference to the accompanying drawings. Apparently, the embodiments in the description are only part rather than all of the embodiments of the present invention. All other embodiments obtained by persons of ordinary skill in the art based on the embodiments of the present invention without creative efforts shall fall within the protection scope of the present invention.

Figure 1:
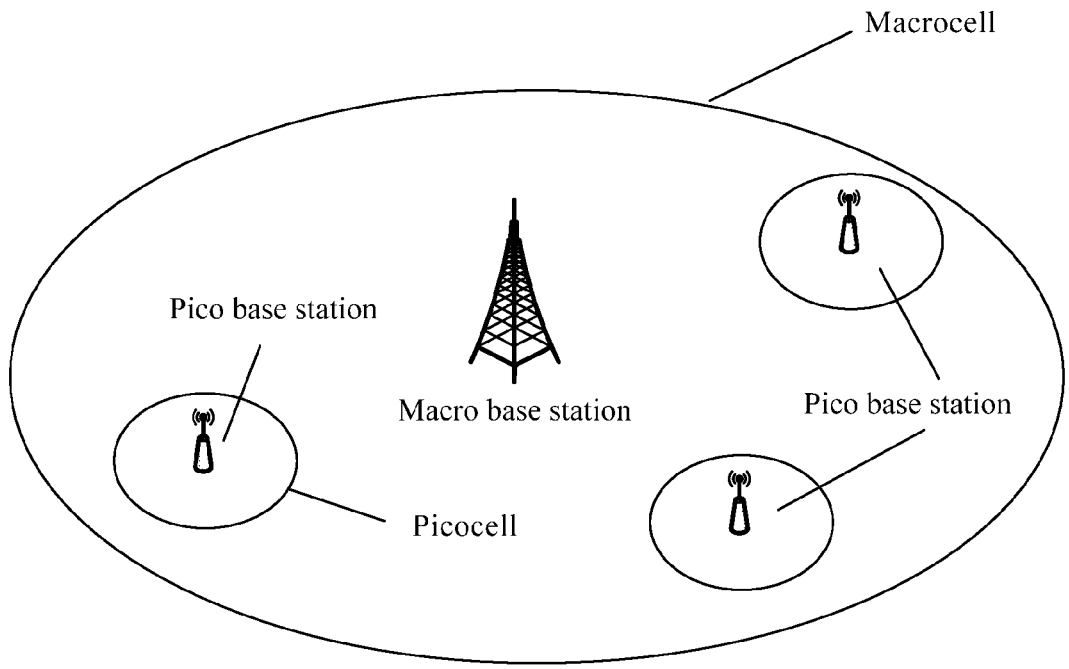
FIG. 1 is a schematic diagram of a heterogeneous network in the prior art.
Figure 2:
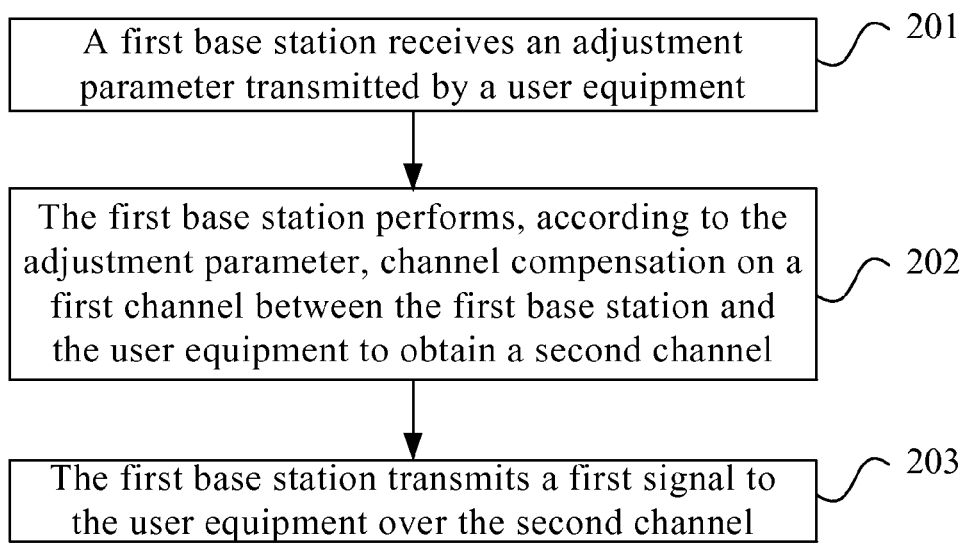
FIG. 2 is a flowchart of a first embodiment of a data transmission processing method according to the present invention.

FIG. 2 is a flowchart of a first embodiment of a data transmission processing method according to the present invention. As shown in FIG. 2, in this embodiment, a first base station is taken as an execution body. The method includes the following steps.

Step 201: The first base station receives an adjustment parameter transmitted by a terminal, where the adjustment parameter is obtained by the terminal according to reference signals separately transmitted by the first base station and a second base station.

In application scenarios of embodiments of the present invention, the terminal (Terminal, UE for short) corresponds to the first base station, the first base station and the second base station transmit downlink signals using a same spectrum, the strength of a downlink signal transmitted by the second base station is greater than that of a downlink signal transmitted by the first base station, and frame structures of the downlink signals transmitted by the first base station and the second base station are synchronized. When receiving a signal transmitted by the first base station, the UE simultaneously receives a signal transmitted by the second base station.

The UE performs pilot detection on the reference signals of the first base station and the second base station, and detects a channel between the UE and the first base station and a channel between the UE and the second base station. To eliminate interference from the signal transmitted by the second base station, the UE obtains the adjustment parameter according to the detected channels, and then transmits the adjustment parameter to the first base station so that the first base station performs pre-compensation on a first channel between the first base station and the UE.

Step 202: The first base station performs, according to the adjustment parameter, channel compensation on the first channel between the first base station and the terminal to obtain a second channel.

After receiving the adjustment parameter transmitted by the UE, the first base station performs, according to the adjustment parameter, pre-compensation on the first channel between the first base station and the UE to obtain the second channel. A phase of the first channel and a modulus of the first channel may be adjusted according to the adjustment parameter, or a channel matrix may be pre-rotated according to the adjustment parameter, so as to perform pre-compensation on the first channel.

Step 203: The first base station transmits the first signal to the terminal over the second channel so that the terminal obtains the first signal from a mixed signal including the first signal and a second signal that is transmitted by the second base station.

The first signal and the second signal are transmitted by the first base station and the second base station using the same spectrum to the terminal, respectively; and the strength of the second signal is greater than that of the first signal.

After performing pre-compensation on the first channel and obtaining the second channel, the first base station transmits the first signal to the UE over the second channel; and meanwhile, the second base station transmits the second signal. The mixed signal received by the UE includes the first signal and the second signal. The first base station performs pre-compensation on the channel, so that the UE is capable of separating the first signal and the second signal in the mixed signal to obtain the first signal. For example, the UE may obtain the first signal from a constellation diagram corresponding to the mixed signal.

In the embodiment of the present invention, the terminal obtains the adjustment parameter according the reference signals of the first base station and the second base station. The first base station performs, according to the adjustment parameter obtained by the terminal, pre-compensation on the first channel between the first base station and the terminal to obtain the second channel, and transmits the first signal to the terminal over the second channel so that the terminal is capable of obtaining the first signal from the mixed signal of the first signal and the second signal that is transmitted by the second base station using the same spectrum as that of the first signal. In this way, the first base station and the second base station can use the same spectrum to transmit signals, which improves system throughput.

Figure 3:
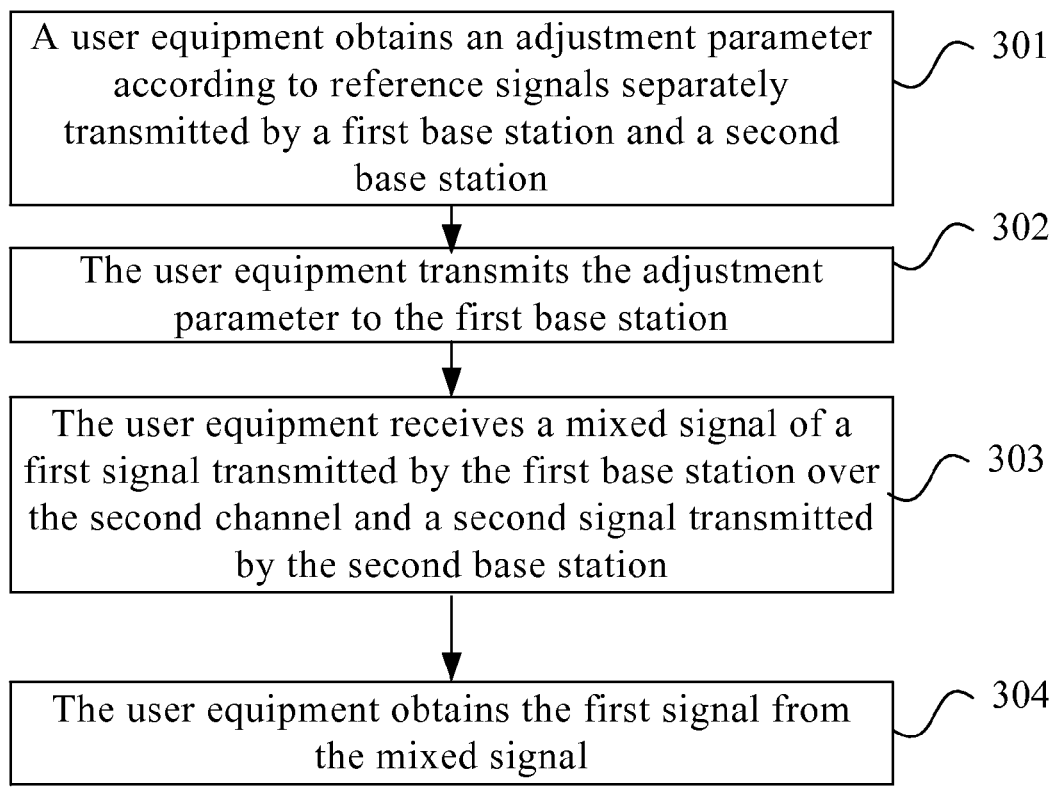
FIG. 3 is a flowchart of a second embodiment of a data transmission processing method according to the present invention.

FIG. 3 is a flowchart of a second embodiment of a data transmission processing method according to the present invention. As shown in FIG. 3, in this embodiment, a terminal is taken as an execution body. The method includes the following steps.

Step 301: A terminal obtains an adjustment parameter according to reference signals separately transmitted by a first base station and a second base station.

This embodiment corresponds to the first method embodiment shown in FIG. 2. For the application scenario and related details, reference is made to the description in the first method embodiment.

The UE performs pilot detection on the reference signals of the first base station and the second base station, and detects a channel between the UE and the first base station and a channel between the UE and the second base station. To eliminate interference from a signal transmitted by the second base station, the UE obtains the adjustment parameter according to the detected channels so that the first base station performs pre-compensation on a first channel between the first base station and the UE.

Step 302: The terminal transmits the adjustment parameter to the first base station, so that the first base station performs, according to the adjustment parameter, channel compensation on the first channel between the first base station and the terminal to obtain a second channel.

The UE transmits the obtained an adjustment parameter to the first base station, so that the first base station, after receiving the adjustment parameter transmitted by the UE, performs, according to the adjustment parameter, pre-compensation on the first channel between the first base station and the UE to obtain the second channel. A phase of the first channel and a modulus of the first channel may be adjusted according to the adjustment parameter, or a channel matrix may be pre-rotated according to the adjustment parameter, so as to perform pre-compensation on the first channel.

Step 303: The terminal receives a mixed signal of a first signal transmitted by the first base station over the second channel and a second signal transmitted by the second base station.

After performing pre-compensation on the first channel to obtain the second channel, the first base station transmits the first signal to the UE over the second channel; and meanwhile the second base station transmits the second signal. The mixed signal received by the UE includes the first signal and the second signal. The first signal and the second signal are separately transmitted by the first base station and the second base station using a same spectrum to the terminal; and the strength of the second signal is greater than that of the first signal.

Step 304: The terminal obtains the first signal from the mixed signal.

The first base station performs pre-compensation on the channel so that the UE is capable of separating the first signal and the second signal in the mixed signal to obtain the first signal. For example, the UE may obtain the first signal from a constellation diagram corresponding to the mixed signal.

In the embodiment of the present invention, the terminal obtains the adjustment parameter according the reference signals of the first base station and the second base station, and transmits the adjustment parameter to the first base station, so that the first base station performs, according to the adjustment parameter obtained by the terminal, pre-compensation on the first channel between the first base station and the terminal to obtain the second channel, and first base station transmits the first signal to the terminal over the second channel, The terminal obtains the first signal from the mixed signal of the first signal and the second signal that is transmitted by the second base station using the same spectrum as that of the first signal. In this way, the first base station and the second base station can use the same spectrum to transmit signals, which improves system throughput.

The embodiment of the present invention may be applied in HetNet architecture. The HetNet may include a macro base station (Macro eNB) and multiple pico base stations (Pico eNBs). The UE in the embodiment of the present invention may be a Pico UE of a Pico eNB. The embodiment of the present invention is applicable to a process that the Pico eNB transmits data to multiple Pico UEs using a single-antenna or multi-antenna technology. The following embodiments use only a processing process of a Pico UE and pre-processing by the Pico eNB for the Pico UE as examples for illustration. In the following embodiments, the Pico UE is indicated by PUE1, the Pico eNB is indicated by PeNB1, and the Macro eNB is indicated by MeNB1. The following separately describes scenarios where the Pico eNB uses a single antenna and multiple antennas.

Figure 4:
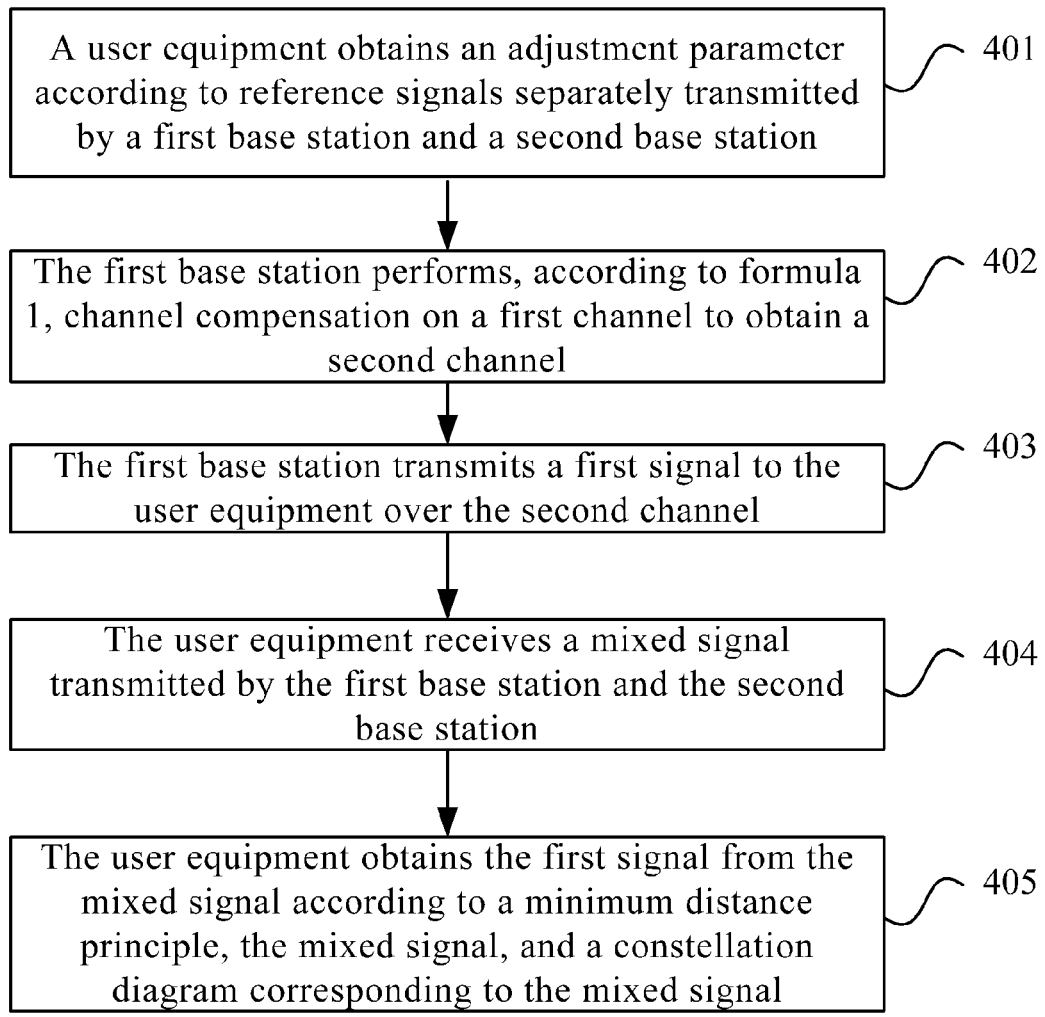
FIG. 4 is a flowchart of a third embodiment of a data transmission processing method according to the present invention.

FIG. 4 is a flowchart of a third embodiment of a data transmission processing method according to the present invention. This embodiment is applied in a scenario of a single antenna. As shown in FIG. 4, the method includes the following steps.

Step 401: A terminal obtains an adjustment parameter according to reference signals separately transmitted by a first base station and a second base station. The adjustment parameter includes $A_1$ and $B_1$, where $A_1 = \text{ang}(H_1^m) - \text{ang}(H_1^p)$, and $$B_1 = \min\left(\frac{|H_1^m|}{\gamma |H_1^p|}, 1\right).$$

In this embodiment, the first base station may be PeNB1, the second base station may be MeNB1, and the terminal may be PUE1. PeNB1 and MeNB1 use a same spectrum to transmit downlink signals. In this embodiment, MeNB1 transmits a single data stream and PUE1 has only one antenna.

$H_1^p$ indicates a first channel between PeNB1 and PUE1;

$|H_1^p|$ Indicates a modulus of the first channel between PeNB1 and PUE1;

ang $(H_1^p)$ indicates a phase of the first channel between PeNB1 and PUE1;

$H_1^m$ indicates a channel between MeNB1 and PUE1;

$|H_1^m|$ indicates a modulus of the channel between MeNB1 and PUE1; and ang$(H_1^m)$ indicates a phase of the channel between MeNB1 and PUE1; and $\gamma$ is a constant greater than 1.

PUE1 detects $H_1^p$ and $H_1^m$ according to reference signals (reference signals) of PeNB1 and MeNB1, and obtain adjustment parameters $A_1$ and $B_1$ by calculation according to $H_1^p$ and $H_1^m$.

Step 402: The first base station performs, according to formula 1, channel compensation on the first channel to obtain a second channel. Formula 1 is $H_1^{P'}=H_1^P \times e^{iA_1} \times B_1$, where $H_1^{P'}$ indicates the second channel.

PeNB1 performs channel compensation on the first channel according to formula 1, and adjusts the modulus of the first channel and the phase of the first channel to obtain the second channel.

After PeNB1 obtains the second channel, PUE1 may obtain the second channel from the reference signal of PeNB1. PUE1 receives a modulation mode of the PeNB1 transmitted by PeNB1 and a modulation mode of MeNB1, where the modulation mode of MeNB1 may be transmitted to PUE1 by MeNB1, or may also be transmitted to PUE1 by PeNB1 after PeNB1 obtains the modulation mode from MeNB1. PUE1 may also obtain a third channel from the reference signal of MeNB1. The third channel is a channel between MeNB1 and PUE1. PUE1 normalizes the modulation modes of PeNB1 and MeNB1, and the signals of the second channel and the third channel, to generate a constellation diagram after superposition of signals transmitted by PeNB1 and MeNB1, that is, the constellation diagram is obtained by superposing a constellation diagram of PeNB1 and a constellation diagram of MeNB1. The normalization process may be: for example, dividing a signal received by PUE1 by channel $H_1^{m}$. That is, according to the modulation modes indicating PeNB1 and MeNB1, and to-be-normalized channel information of the second channel and the third channel, PUE1 generates a constellation diagram after superposition of signals transmitted by PeNB1 and MeNB1, that is, the constellation diagram is obtained by superposing a constellation diagram of PeNB1 and a constellation diagram of MeNB1. The normalization process may be: for example, dividing a signal received by PUE1 by channel $H_1^{m}$.

Step 403: The first base station transmits a first signal to the terminal over the second channel.

PeNB1 transmits a signal to PUE1 over the second channel. The signal is called the first signal.

Step 404: The terminal receives a mixed signal transmitted by the first base station and the second base station. The mixed signal includes the first signal transmitted by the first base station and the second signal transmitted by the second base station.

PUE1 receives the mixed signal. The mixed signal includes the first signal and the second signal that are transmitted by MeNB1 and PeNB1.

Step 405: The terminal obtains the first signal from the mixed signal according to a minimum distance principle, the mixed signal, and a constellation diagram corresponding to the mixed signal.

The constellation diagram that is generated by PUE1 after superposition of signals transmitted by PeNB1 and MeNB1 is the constellation diagram corresponding to the mixed signal.

If step 401 and the pre-compensation operation on the first channel in step 402 are not performed, an error probability may be high when the first signal is obtained according to the superposed constellation diagram. This is because of the difference between the second channel and the third channel. In the superposed constellation diagram, the first signal is rotated to a certain angle relative to the second signal, and has different relative amplitude. Specifically, there is an angle between the constellation diagram of PeNB1 and the constellation diagram of MeNB1. The angle may shorten the minimum distance between signals of the superposed constellation diagram, and increase an error probability of detection. Due to uncertainty of small-scale channel attenuation, the constellation diagram of PeNB1 may have too great amplitude so that the constellation diagram of PeNB1 may overlap the constellation diagram obtained through superposition of multiple constellation diagrams of MeNB1. Consequently, an error probability is high when demodulation is performed according to the minimum distance principle.

In an embodiment, the angle between the constellation diagram of PeNB1 and the constellation diagram of MeNB1 is a random angle. The angle may shorten the minimum distance between signals of the superposed constellation diagram, and increase the error probability of detection. Due to the uncertainty of the small-scale channel attenuation, a small distance between signals may occur in the constellation diagram obtained through superposition of the constellation diagram of PeNB1 and the constellation diagram of MeNB1. Consequently, the error probability is high when demodulation is performed according to the minimum distance principle.

Therefore, in the embodiment of the present invention, the first signal transmitted by PeNB1 is pre-processed, that is, PeNB1 performs pre-compensation on the first channel, so that the first signal is pre-processed before being transmitted. Thereby, the phase and amplitude of the constellation diagram of PeNB1 are adjusted so that PUE1 can accurately obtain the first signal from the superposed constellation diagram. Experiments prove that, to ensure that PUE1 can accurately obtain the first signal from the superposed constellation diagram, a preferable phase is a phase ensuring that the angle formed by the constellation diagram of PeNB1 and the constellation diagram of MeNB1 is a multiple of 90°, and a preferable amplitude is an amplitude ensuring that the amplitude of the constellation diagram of PeNB1 is half of the amplitude of the constellation diagram of MeNB1. Through the method provided in the embodiment of the present invention, pre-compensation is performed on the first channel. According to the speed of channel change, the value of γ is adaptively adjusted, so that the constellation diagram of PeNB1 meets the foregoing requirements of the phase and amplitude as much as possible. A channel changes along with time, and an adjustment parameter is calculated according to a channel at current time. However, when an adjusted channel is used to transmit data, an optimal adjustment parameter may be changed. Therefore, in the method provided in the embodiment of the present invention, the value of γ is adjusted so that an adjusted constellation diagram meets the foregoing requirements. When the channel change slowly, γ=2 preferably.

Figure 5:
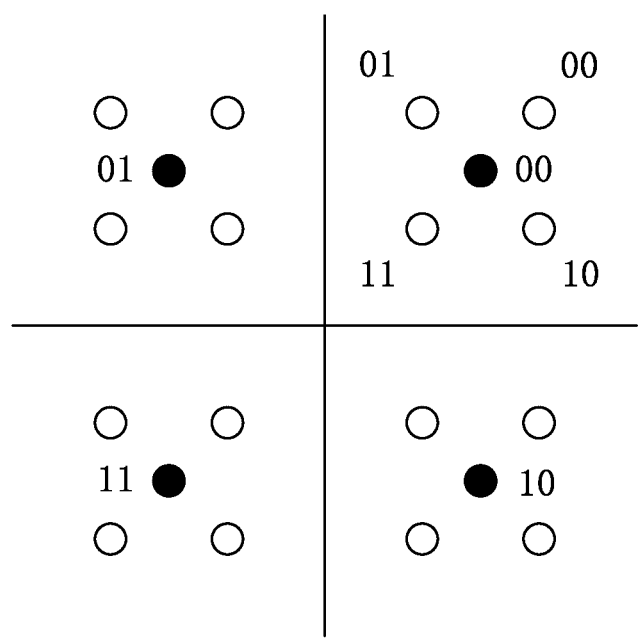
FIG. 5 is a constellation diagram after superposition according to an embodiment of the present invention.

FIG. 5 is a constellation diagram after superposition according to an embodiment of the present invention. As shown in the constellation diagram in FIG. 5, PeNB1 and MeNB1 both adopts the quadrature phase shift keying (Quadrature Phase Shift Keying, QPSK for short) modulation mode to transmit downlink signals. Black dots correspond to signal transmitted by MeNB1, and white dots correspond to superposition of signal transmitted by PeNB1 and the signal transmitted by MeNB1. In FIG. 5, 00, 01, 10, and 11 indicate the data that corresponds, before the signal is modulated by PeNB1 or MeNB1, to the signal transmitted by PeNB1 or MeNB1.

PUE1 finds, according to the minimum distance principle and in the constellation diagram after superposition, a point closest to a received mixed signal, so as to separately detect a first signal and a second signal. For example, if the received mixed signal is closest to white dot 10 superposed with black dot 00, it may be detected that data corresponding to the first signal is 10 and data corresponding to the second signal is 00. After the first signal is detected, PUE1 demodulates and decodes the first signal.

In the embodiment of the present invention, the terminal obtains the adjustment parameter according the reference signals of the first base station and the second base station, the first base station performs pre-compensation on the first channel between the first base station and the terminal according to the adjustment parameter obtained by the terminal to obtain the second channel, and transmits the first signal to the terminal over the second channel, and the second base station transmits the second signal using the same spectrum as the first base station. The first base station performs pre-compensation on the first channel, so that the first signal and the second signal are superposed in an one-to-one manner, and the phase and amplitude of each superposed constellation diagram are adjusted. Thereby, the terminal can detect the first signal and the second signal from the constellation diagram corresponding to the mixed signal that includes the first signal and the second signal. In this way, the first base station and the second base station can use the same spectrum to transmit signals, which improves system throughput.

Figure 6:
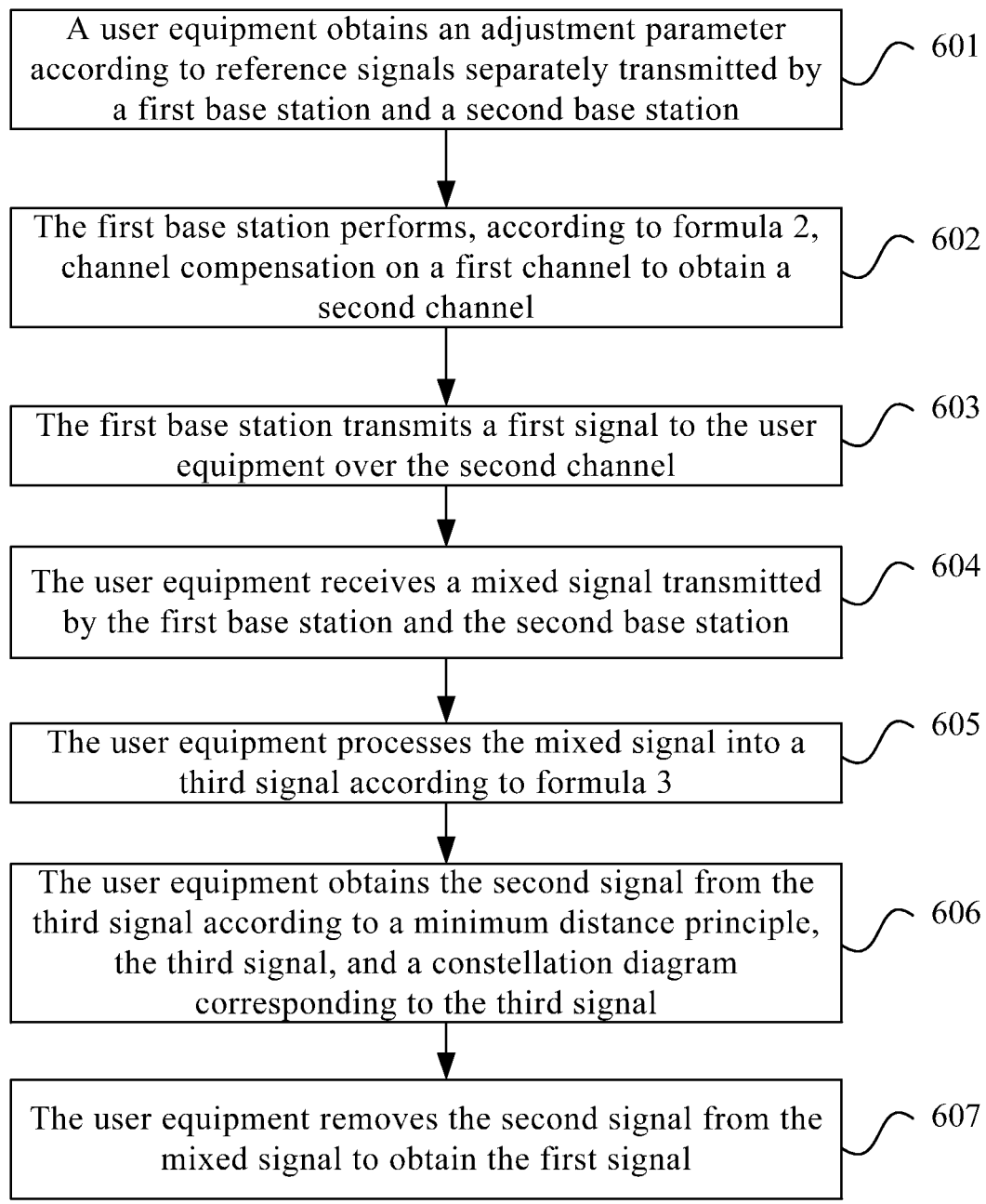
FIG. 6 is a flowchart of a fourth embodiment of a data transmission processing method according to the present invention.

FIG. 6 is a flowchart of a fourth embodiment of a data transmission processing method according to the present invention. This embodiment is applied in a scenario of multiple antennas. As shown in FIG. 6, the method includes the following steps.

Step 601: A terminal obtains an adjustment parameter according to reference signals separately transmitted by a first base station and a second base station. The adjustment parameter includes P, where $P = A_2 \cdot H_2^m$.

In this embodiment, the first base station may be PeNB1, the second base station may be MeNB1, and the terminal may be PUE1. PeNB1 and MeNB1 use a same spectrum to transmit downlink signals.

An application scenario of this embodiment may be: MeNB1 transmits M data streams, PeNB1 transmits L data streams to PUE1, and PUE1 has N antennas, where M≤N, L≤N, M+L>N. It is defined that K=M+L−N. The foregoing scenario may be equivalent to a case that MeNB1 transmits K data streams, PeNB1 transmits K data streams to PUE1, and PUE1 has K receiving antennas. The detailed reasons for this is as follows: Because PUE1 has N receiving antennas (that is, capable of differentiating N data streams), in the L data streams transmitted by PeNB1, N−M data streams may be received without interference, and the remaining K=L−(N−M) data streams may suffered interference of MeNB1; PUE1 may eliminate L−K data streams of MeNB1 through simple design of a receiver, so as to obtain a signal obtained through superposition of K data streams of MeNB1 and K data streams of PeNB1. In addition, if MeNB1 adopts a space time coding (Space Time Coding) manner for transmission, the foregoing idea may also be adopted for equivalence. The following describes in detail a scenario after equivalence. In this scenario, the terminal, the first base station, and the second base station include K antennas each and K>1.

In the adjustment parameter P:

$H_2^m = (H_{2a,b}^m)|_{a=1,2,\ldots,K; b=1,2,\ldots,K}$, where $H_2^m$ indicates a channel matrix from the second base station to the terminal, $H_{2a,b}^m$ indicates an element in row a, column b in the channel matrix $H_2^m$, $H_{2a,b}^m$ indicates a channel from a $b^{th}$ antenna of the second base station to an $a^{th}$ antenna of the terminal; and $H_2^P = (H_{2a,b}^P)|_{a=1,2,\ldots,K; b=1,2,\ldots,K}$, where $H_2^P$ indicates a channel matrix corresponding to a first channel from the first base station to the terminal, $H_{2a,b}^P$ indicates an element in row a, column b in the channel matrix $H_2^P$, and $H_{2a,b}^P$ indicates a first channel from the $b^{th}$ antenna of the first base station to the $a^{th}$ antenna of the terminal.

For $A_2$, there are two construction methods.

One is a construction method based on zero-forcing (Zero-forcing): $A_2 = \alpha(H_2^P)^{-1}$, where a coefficient $\alpha$ is used to ensure that a sum of elements on a diagonal line after matrix P is multiplied by a conjugate transpose of matrix P is smaller than or equal to 1, that is, $tr(PP^*) \leq 1$; and $P^*$ indicates the conjugate transpose of matrix P.

The other is a construction method based on a minimum mean square error (Minimum mean square error, MMSE for short): $A_2 = \alpha(H_2^P)^*(H_2^P(H_2^P)^* + \beta I)^{-1}$, where I indicates a unit matrix, and $\beta$ indicates power of noise on each antenna of the terminal. $(H_2^P)^*$ indicates the conjugate transpose of matrix $H_2^P$; and the coefficient $\alpha$ is the same as above.

Step 602: The first base station performs, according to formula 2, channel compensation on the first channel to obtain a second channel. Formula 2 is $H_2^{P'} = H_2^P P$, where $H_2^{P'}$ indicates a channel matrix corresponding to the second channel.

Before PeNB1 obtains the second channel and transmits a signal over the second channel, PUE1 may obtain the second channel from a reference signal of PeNB1. PUE1 receives a modulation mode of the PeNB1 transmitted by PeNB1 and a modulation mode of MeNB1. The modulation mode of MeNB1 may be transmitted to PUE1 by MeNB1, or may also be transmitted to PUE1 by PeNB1 after PeNB1 obtains the modulation mode from MeNB1. PUE1 may also obtain a third channel from a reference signal of MeNB1. PUE1 generates, according to the modulation modes of PeNB1 and MeNB1, the second channel and the third channel, a constellation diagram after superposition of signals transmitted by PeNB1 and MeNB1. That is, according to the modulation modes indicating PeNB1 and MeNB1, and to-be-normalized channel information of the second channel and the third channel, PUE1 generates a constellation diagram after superposition of signals transmitted by PeNB1 and MeNB1. For detailed description, reference is made to the description in the second method embodiment.

Step 603: The first base station transmits a first signal to the terminal over the second channel.

PeNB1 transmits a signal to PUE1 over the second channel. The signal is called the first signal.

Step 604: The terminal receives a mixed signal transmitted by the first base station and the second base station. The mixed signal includes the first signal transmitted by the first base station and the second signal transmitted by the second base station.

Step 605: The terminal processes the mixed signal into a third signal according to formula 3, where formula 3 is $\tilde{Y} = BY$.

PUE1 performs left-multiplication on a signal received on each antenna and matrix B.

$Y = [y_1, y_2, \ldots, y_K]^T$, indicating a signal vector of the received mixed signal, where $y_i$ indicates a symbol received by PUE1 on an $i^{th}$ antenna; and $\tilde{Y}$ indicates a signal vector of the third signal.

Theoretically, the mixed signal may be indicated by: $Y = H_2^m U_2^m + H_2^P P U_2^P + Z$. $U_2^P = [u_1^P, u_2^P, \ldots, u_K^P]^T$, where $u_i^P$ represents a modulation symbol of an $i^{th}$ data stream transmitted by PeNB1 to PUE1, and $U_2^m$ indicates a signal vector of the second signal; $U_2^m = [u_1^m, u_2^m, \ldots, u_K^m]^T$, where $u_i^m$ indicates a modulation symbol of an data stream transmitted by MeNB1 and Z indicates a noise vector.

For B, there are two construction methods: One is a construction method based on Zero-forcing, $B = (H_2^m)^{-1}$; and the other is a construction method based on an MMSE, $B = ((H_2^m)^* H_2^m + \beta I)^{-1}(H_2^m)^*$.

Step 606: The terminal obtains the second signal from the third signal according to a minimum distance principle, the third signal, and a constellation diagram corresponding to the third signal.

After step 605, each element in the vector $\tilde{Y}$ of the third signal is a superposition of one first signal of PeNB1 and one second signal of MeNB1. In this embodiment, PUE1 may generate K constellation diagrams after superposition, according to the modulation mode of PeNB1, the modulation mode of MeNB1, the second channel, and the third channel. K elements in the vector $\hat{Y}$ are corresponding to the K constellation diagrams after superposition one to one. PUE1 may detect, according to the minimum distance principle, each element in the vector $\hat{Y}$, and a constellation diagram that is after superposition and corresponds to the element, data that corresponds, before the second signal is modulated by MeNB1, to the second signal transmitted by MeNB1 (for a specific detection process, reference is made to the description in step 405 in the second embodiment, which is not detailed here), so as to obtain the signal vector of the second signal, marked as $\tilde{U}_2^m$. The K constellation diagrams after superposition are constellation diagrams corresponding to the third signal.

Step 607: The terminal removes the second signal from the mixed signal to obtain the first signal.

PUE1 removes the second signal from the mixed signal according to formula 4, and obtain the first signal from the mixed signal from which the second signal is removed. Formula 4 is $\hat{Y}=Y-H_2^m\tilde{U}_2^m$, where $\tilde{U}_2^m$ indicates the signal vector of the second signal, where the signal vector of the second signal is obtained by the terminal in step 606, and $\hat{Y}$ indicates a signal vector of the mixed signal from which the second signal is removed.

Specifically, according to formula 4, cuts the second signal transmitted by MeNB1 from the mixed signal received by PUE1 to obtain $\hat{Y}$; and then according to common design of a SU-MIMO receiver, PUE1 detects a signal vector of the first signal transmitted by PeNB1, that is, detects the first signal, from $\hat{Y}$.

In the embodiment of the present invention, the terminal obtains the adjustment parameter according the reference signals of the first base station and the second base station, the first base station performs, according to the adjustment parameter obtained by the terminal, channel compensation on the first channel between the first base station and the terminal to obtain the second channel, and transmits the first signal to the terminal over the second channel, and the second base station transmits the second signal using the same spectrum as the first base station. The first base station performs pre-compensation on the first channel, and pre-rotates a channel matrix of the first channel, so that the terminal can detect each data stream of the first signal and the second signal from the constellation diagram corresponding to the mixed signal of the first signal and the second signal, In this way, the first base station and the second base station can use the same spectrum to transmit signals, which improves system throughput.

Persons of ordinary skills in the art may understand that all or part of steps in the foregoing method embodiments may be implemented by a program instructing relevant hardware. The program may be stored in a computer readable storage medium. When the program is executed, the steps in the foregoing method embodiments are performed. The storage medium includes various media that can store program codes, such as a ROM, a RAM, a magnetic disk or an optical disk.

Figure 7:
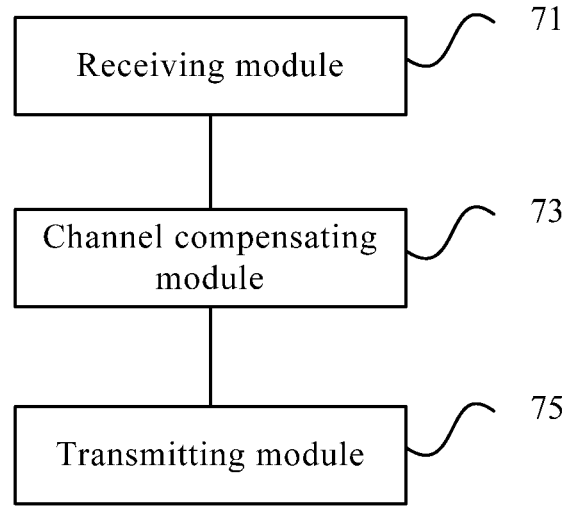
FIG. 7 is a schematic diagram of a first embodiment of a base station according to the present invention.

FIG. 7 is a schematic diagram of a first embodiment of a base station according to the present invention. As shown in FIG. 7, the base station includes: a receiving module 71, a channel compensating module 73, and a transmitting module 75.

The base station in this embodiment is the first base station in the embodiments of the present invention.

The receiving module 71 is configured to receive an adjustment parameter transmitted by a terminal, where the adjustment parameter is obtained by the terminal according to reference signals separately transmitted by a first base station and a second base station.

The channel compensating module 73 is configured to perform, according to the adjustment parameter received by the receiving module 71, channel compensation on a first channel between the first base station and the terminal to obtain a second channel.

The transmitting module 75 is configured to transmit the first signal to the terminal over the second channel obtained by the channel compensating module 73, so that the terminal obtains a first signal from a mixed signal of the first signal and a second signal that is transmitted by the second base station. The first signal and the second signal are transmitted by the first base station and the second base station using a same spectrum to the terminal, respectively; and the strength of the second signal is greater than that of the first signal.

For working principles and working procedures of modules in the embodiment of the present invention, reference is made to the description of the first method embodiment; the details are not repeated here.

In the embodiment of the present invention, the terminal obtains the adjustment parameter according the reference signals of the first base station and the second base station. The first base station performs, according to the adjustment parameter obtained by the terminal, channel compensation on the first channel between the first base station and the terminal to obtain the second channel, and transmits the first signal to the terminal over the second channel, so that the terminal can obtain the first signal from the mixed signal of the first signal and the second signal that is transmitted by the second base station using the same spectrum as that of the first signal. In this way, the first base station and the second base station are capable of using the same spectrum to transmit signals, improving system throughput.

Figure 8:
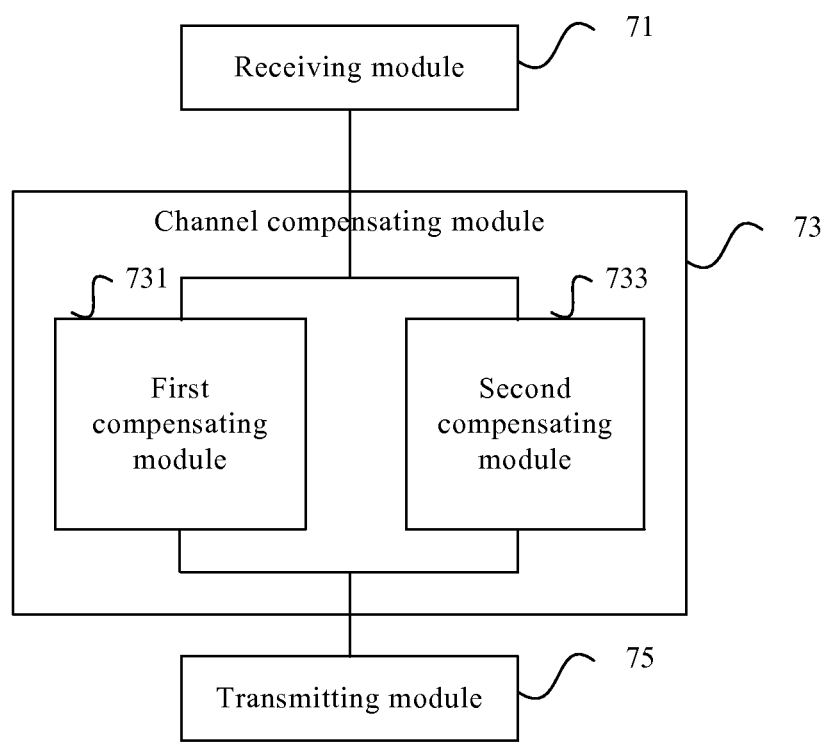
FIG. 8 is a schematic diagram of a second embodiment of a base station according to the present invention.

FIG. 8 is a schematic diagram of a second embodiment of a base station according to the present invention. Based on the embodiment shown in FIG. 7, a channel compensating module 73 may include: a first compensating unit 731 and/or a second compensating unit 733.

The adjustment parameter may include A1 and B1, or the adjustment parameter may include P.

The first compensating unit 731 is configured to, when the terminal has a single antenna, perform, according to formula 1 including A1 and B1, channel compensation on a first channel to obtain a second channel, where formula 1 is $H_1^{P'}=H_1^P\times e^{iA_1}\times B_1$, $H_1^P$ indicates the first channel, $H_1^{P'}$ indicates the second channel, $A1=\text{ang}(H_1^m)\_\text{ang}(H_1^P)$, $$B_1 = \min\left(\frac{|H_1^m|}{\gamma|H_1^P|}, 1\right),$$

$\gamma$ is greater than 1, $|H_1^P|$ indicates a modulus of the first channel, ang $(H_1^P)$ indicates a phase of the first channel, $H_1^m$ indicates a channel between a second base station and a terminal, $|H_1^m|$ indicates a modulus of the channel between the second base station and the terminal, and ang$(H_1^m)$ indicates a phase of the channel between the second base station and the terminal.

The second compensating unit 733 is configured to, when the terminal, the first base station and the second base station include K antennas each, perform, according to formula 2 including P, channel compensation on the first channel to obtain the second channel. Formula 2 is $H_2^{P'}=H_2^P P$, where $H_2^P$ indicates a channel matrix corresponding to the first channel, $H_2^{p'}$ indicates a channel matrix corresponding to the second channel, and $P=A_2 \cdot H_2^m$. $H_2^m=(H_{2a,b}^m)|_{a=1,2,\ldots,K;b=1,2,\ldots,K}$, where $H_2^m$ indicates a channel matrix from the second base station to the terminal, and $H_{2a,b}^m$ indicates a channel from a bth antenna of the second base station to an ath antenna of the terminal. $H_2^P=(H_{2a,b}^P)|_{a=1,2,\ldots,K;b=1,2,\ldots,K}$, where $H_{2a,b}^P$ indicates a first channel from a bth antenna of the first base station to the ath antenna of the terminal, and $(H_2^P)^*$ indicates a conjugate transpose of matrix $H_2^P \cdot A_2 = \alpha(H_2^P)^{-1}$ or $A_2 \alpha (H_2^P)^*(H_2^P(H_2^P)^*+\beta I)^{-1}$, where $\alpha$ is used to ensure that a sum of elements on a diagonal line after matrix P is multiplied by the conjugate transpose of matrix P is smaller than or equal to 1, I indicates a unit matrix, and $\beta$ indicates power of noise on each antenna of the terminal. $K>1$.

For working principles and working procedures of modules and units in the embodiment of the present invention, reference is made to the description of the foregoing method embodiments, the details are not repeated here.

In the embodiment of the present invention, the terminal obtains the adjustment parameter according the reference signals of the first base station and the second base station. The first base station performs, according to the adjustment parameter obtained by the terminal, channel compensation on the first channel between the first base station and the terminal to obtain the second channel, and transmits the first signal to the terminal over the second channel, so that the terminal can obtain the first signal from the mixed signal of the first signal and the second signal that is transmitted by the second base station using the same spectrum as that of the first signal. In this way, the first base station and the second base station can use the same spectrum to transmit signals, which improves system throughput.

Figure 9:
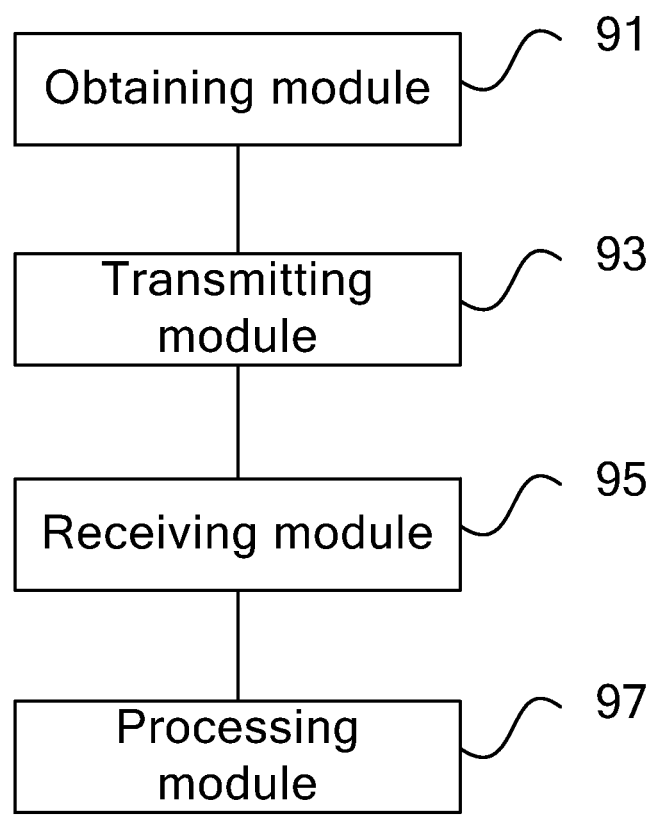
FIG. 9 is a schematic diagram of a first embodiment of a terminal according to the present invention.

FIG. 9 is a schematic diagram of a first embodiment of a terminal according to the present invention. As shown in FIG. 9, the terminal includes: an obtaining module 91, a transmitting module 93, a receiving module 95, and a processing module 97.

The obtaining module 91 is configured to obtain an adjustment parameter according to reference signals separately transmitted by a first base station and a second base station.

The transmitting module 93 is configured to transmit the adjustment parameter obtained by the obtaining module 91 to the first base station, so that the first base station performs, according to the adjustment parameter, channel compensation on a first channel between the first base station and a terminal to obtain a second channel.

The receiving module 95 is configured to receive a mixed signal of a first signal transmitted by the first base station over the second channel and a second signal transmitted by the second base station.

The processing module 97 is configured to obtain a first signal from the mixed signal received by the receiving module 95. The first signal and the second signal are transmitted by the first base station and the second base station using a same spectrum to the terminal, respectively; and the strength of the second signal is greater than that of the first signal.

For working principles and working procedures of modules in the embodiment of the present invention, reference is made to the description of the second method embodiment; the details are not repeated here.

In the embodiment of the present invention, the terminal obtains the adjustment parameter according the reference signals of the first base station and the second base station, and transmits the adjustment parameter to the first base station, so that the first base station performs, according to the adjustment parameter obtained by the terminal, channel compensation on the first channel between the first base station and the terminal to obtain the second channel. The first base station transmits the first signal to the terminal over the second channel and the terminal obtains the first signal from the mixed signal of the first signal and the second signal that is transmitted by the second base station using the same spectrum as that of the first signal. In this way, the first base station and the second base station can use the same spectrum to transmit signals, which improves system throughput.

Figure 10:
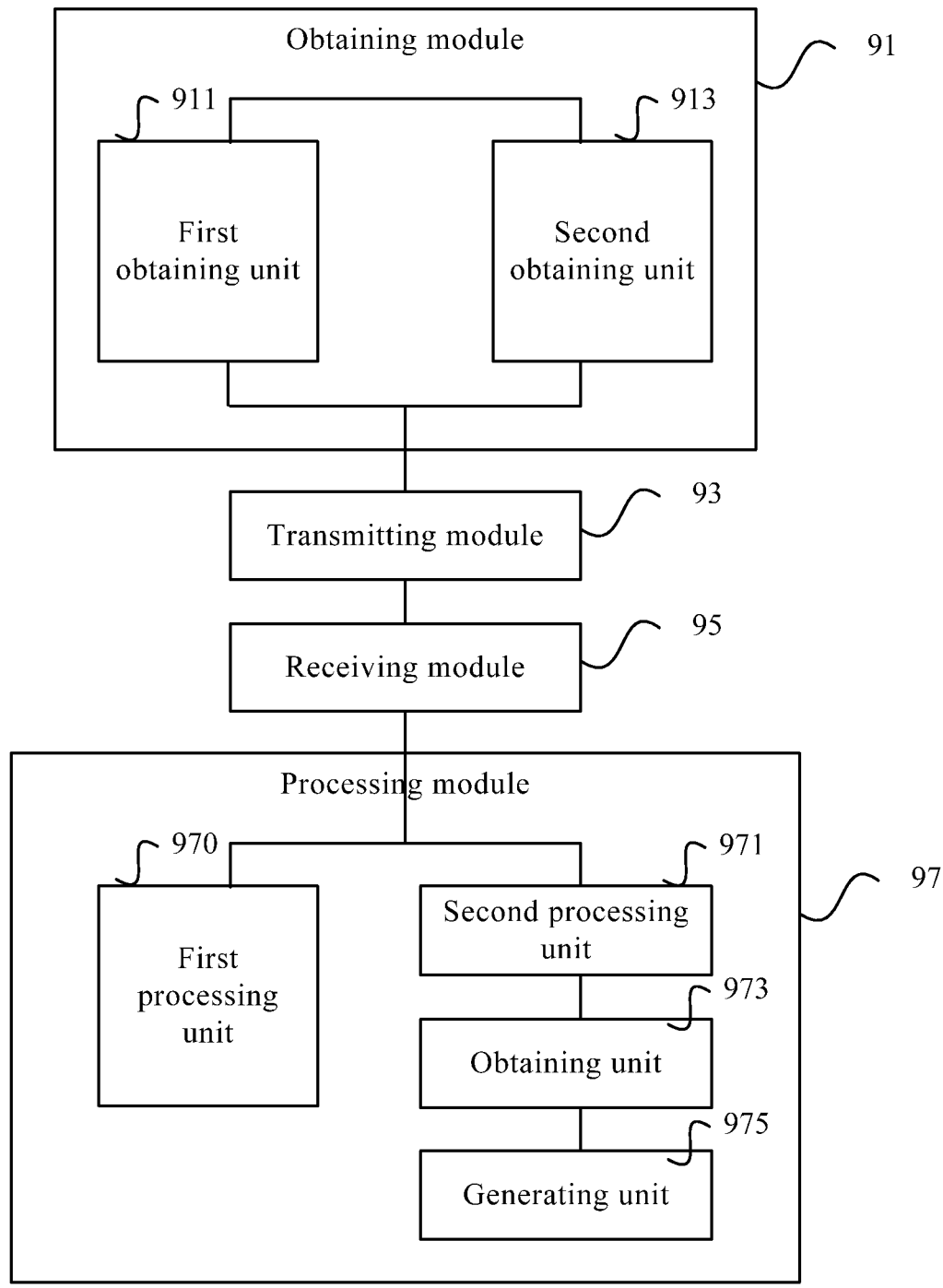
FIG. 10 is a schematic diagram of a second embodiment of a terminal according to the present invention.

FIG. 10 is a schematic diagram of a second embodiment of a terminal according to the present invention. Based on the embodiment shown in FIG. 9, an obtaining module 91 may include: a first obtaining unit 911 and/or a second obtaining unit 913; and an processing module 97 includes a first processing module 970, and/or the processing module 97 includes a second processing module 971, an obtaining unit 973, and a generating unit 975.

An adjustment parameter may include A1 and B1, or the adjustment parameter may include P.

The second obtaining module 911 is configured to obtain A1 and B1 according to reference signals separately transmitted by a first base station and a second base station. $A1=\text{ang}(H_1^m)\_\text{ang}(H_1^P)$, $$B_1 = \min\left(\frac{|H_1^m|}{\gamma|H_1^P|}, 1\right);$$

where $H_1^P$ first channel, $|H_1^P|$ indicates a modulus of the first channel, $\text{ang}(H_1^P)$ indicates a phase of the first channel, $H_1^m$ indicates a channel between the second base station and the terminal, $|H_1^m|$ indicates a modulus of the channel between a second base station and a terminal, $\text{ang}(H_1^m)$ indicates a phase of the channel between the second base station and the terminal, and $\gamma$ is greater than 1.

The second obtaining module 913 is configured to obtain P according to the reference signals separately transmitted by the first base station and the second base station. $P=A_2 \cdot H_2^m$, where $A_2=\alpha(H_2^P)^{-1}$, or $A_2=\alpha(H_2^P)^*(H_2^P(H_2^P)^*+\beta I)^{-1}$, Where, $H_2^m=(H_{2a,b}^m)|_{a=1,2,\ldots,K;b=1,2,\ldots,K}$, $H_2^m$ indicating a channel matrix from the second base station to the terminal, and $H_{2a,b}^m$ indicating a channel from a bth antenna of the second base station to an ath antenna of the terminal;

$H_2^P=(H_{2a,b}^P)|_{a=1,2,\ldots,K;b=1,2,\ldots,K}$, $H_2^P$ indicating a channel matrix corresponding to the first channel, $H_{2a,b}^P$ indicating a first channel from a bth antenna of the first base station to the ath antenna of the terminal; $(H_2^P)^*$ indicates a conjugate transpose of matrix $H_2^P$; and $\alpha$ is used to ensure that a sum of elements on a diagonal line after matrix P is multiplied by the conjugate transpose of matrix P is smaller than or equal to 1, I indicates a unit matrix, and $\beta$ indicates the power of noise on each antenna of the terminal.

The first processing unit 970 is configured to, when the adjustment parameter includes A1 and B1, obtain the first signal from the mixed signal according to a minimum distance principle, the mixed signal, and a constellation diagram corresponding to the mixed signal.

The second processing unit 971 is configured to, when the adjustment parameter includes P, process the mixed signal into a third signal according to formula 3. Formula 3 is $\tilde{Y}=BY$, where Y indicates a signal vector of the mixed signal, $\tilde{Y}$ indicates a signal vector of the third signal, and $B=(H_2^m)^{-1}$ or $B=((H_2^m)^*H_2^m+\beta I)^{-1}(H_2^m)^*$.

The obtaining unit 973 is configured to obtain, according to the minimum distance principle, the third signal, and a constellation diagram corresponding to the third signal, the second signal from the third signal generated by the second processing unit 971.

The generating unit 975 is configured to remove, from the mixed signal, the second signal obtained by the obtaining unit 973, to obtain the first signal.

The generating unit 975 is specifically configured to remove, according to formula 4, the second signal from the mixed signal, to obtain the first signal from the mixed signal from which the second signal is removed. Formula 4 is $\hat{Y}'=\hat{Y}-H_2^m \tilde{U}_2^m$ where $\tilde{U}_2^m$ indicates a signal vector of the second signal obtained by the terminal; and $\hat{Y}$ indicates a signal vector of the mixed signal from which the second signal is removed.

For working principles and working procedures of modules and units in this embodiment, reference is made to the description of the foregoing method embodiments, the details are not repeated here.

In the embodiment of the present invention, the terminal obtains the adjustment parameter according the reference signals of the first base station and the second base station, and transmits the adjustment parameter to the first base station, so that the first base station performs, according to the adjustment parameter obtained by the terminal, channel compensation on the first channel between the first base station and the terminal to obtain the second channel. The first base station transmits the first signal to the terminal over the second channel and the terminal obtains the first signal from the mixed signal of the first signal and the second signal that is transmitted by the second base station using the same spectrum as that of the first signal. In this way, the first base station and the second base station can use the same spectrum to transmit signals, which improves system throughput.

An embodiment of the present invention further provides a data transmission processing system. The system includes a second base station, a base station in any one of the embodiments shown in FIG. 7 and FIG. 8, and a terminal in any one of the embodiments shown in FIG. 9 and FIG. 10. The second base station may be a macro base station.

For the working principles and working procedures of the base stations and terminal in the embodiment of the present invention, reference is made to the description of the foregoing method embodiments, the details are not repeated here.

In the embodiment of the present invention, the terminal obtains the adjustment parameter according the reference signals of the first base station and the second base station, and transmits the adjustment parameter to the first base station, so that the first base station performs, according to the adjustment parameter obtained by the terminal, channel compensation on the first channel between the first base station and the terminal to obtain the second channel. The first base station transmits the first signal to the terminal over the second channel and the terminal obtains the first signal from the mixed signal of the first signal and the second signal that is transmitted by the second base station using the same spectrum as that of the first signal. In this way, the first base station and the second base station can use the same spectrum to transmit signals, which improves system throughput.

Finally, it should be noted that the foregoing embodiments are merely used for illustrating the technical solutions of the present invention, but not intended to limit the present invention. Although the present invention has been described in detail with reference to the embodiments, persons of ordinary skill in the art should understand that: modifications can be made to the technical solutions recorded in the foregoing embodiments, or equivalent replacements can be made to some technical features in the technical solutions; and these modifications or replacements do not cause the essence of corresponding technical solutions to depart from the spirit and scope of the present invention.

What is claimed is:

1. A data transmission processing method, comprising:
   receiving, by a first base station, an adjustment parameter transmitted by a terminal, wherein the adjustment parameter is obtained by the terminal according to reference signals separately transmitted by the first base station and a second base station;
   performing, by the first base station and according to the adjustment parameter, channel compensation on a first channel between the first base station and the terminal to obtain a second channel;
   transmitting, by the first base station, a first signal over the second channel to the terminal, so that the terminal obtains the first signal from a mixed signal of the first signal and a second signal that is transmitted by the second base station, wherein the first signal and the second signal are transmitted by the first base station and the second base station using a same spectrum to the terminal, respectively; and
   wherein the adjustment parameter comprises $A_1$ and $B_1$ when the terminal has a single antenna, where $A_1$ comprises a difference between a phase of the first channel and a phase of a channel between the second base station and the terminal, and where $B_1$ comprises a ratio of a modulus of the channel between the second base station and the terminal and a modulus of the first channel.

2. The data transmission processing method according to claim 1, wherein a strength of the second signal is greater than that of the first signal.

3. The data transmission processing method according to claim 1, wherein the adjustment parameter comprises $A_1$ and $B_1$ according to the formula:

$$A_1 = ang(H_1^m) - ang(H_1^p), \text{ and}$$

$$B_1 = \min\left(\frac{|H_1^m|}{\gamma |H_1^p|}, 1\right);$$

wherein $H_1^p$ indicates the first channel, $|H_1^p|$ indicates the modulus of the first channel, ang $(H_1^p)$ indicates the phase of the first channel, $H_1^m$ indicates the channel between the second base station and the terminal, $|H_1^m|$ indicates the modulus of the channel between the second base station and the terminal, ang $(H_1^m)$ indicates the phase of the channel between the second base station and the terminal, and $\gamma$ is greater than 1.

4. The data transmission processing method according to claim 3, wherein performing channel compensation on the first channel between the first base station and the terminal to obtain the second channel comprises:
   performing, by the first base station and according to formula 1, channel compensation on the first channel to obtain the second channel,
   wherein formula 1 is $H_1^{p'} = H_1^p \times e^{iA_1} \times B_1$, $H_1^{p'}$ indicating the second channel.

5. The data transmission processing method according to claim 1, wherein the adjustment parameter comprises P when the terminal, the first base station, and the second base station comprise K antennas each, wherein K>1 and,
   wherein $P = A_2 \cdot H_2^m$; and
   $A_2 = \alpha(H_2^p)^{-1}$ or $A_2 = \alpha(H_2^p)^*(H_2^p(H_2^p)^* + \beta I)^{-1}$;

wherein $H_2^m = (H_{2a,b}^m)|_{a=1,2,\ldots,K;b=1,2,\ldots,K}$, $H_2^m$ indicating a channel matrix from the second base station to the terminal, and $H_{2a,b}^m$ indicating a channel from a $b^{th}$ antenna of the second base station to an $a^{th}$ antenna of the terminal;

$H_2^p = (H_{2a,b}^p)|_{a=1,2,\ldots,K;b=1,2,\ldots,K}$, $H_2^p$ indicating a channel matrix corresponding to the first channel, $H_{2a,b}^p$ indicating a first channel from a $b^{th}$ antenna of the first base station to an $a^{th}$ antenna of the terminal, and $(H_2^p)^*$ indicating a conjugate transpose of matrix $H_2^p$; and $\alpha$ is used to ensure that a sum of elements on a diagonal line after matrix P is multiplied by the conjugate transpose of matrix P is smaller than or equal to 1, I indicates a unit matrix, and $\beta$ indicates power of noise on each antenna of the terminal.

6. The data transmission processing method according to claim 5, wherein the performing, by the first base station and according to the adjustment parameter, channel compensation on a first channel between the first base station and the terminal to obtain a second channel comprises:

performing, by the first base station and according to formula 2, channel compensation on the first channel to obtain the second channel, wherein formula 2 is $H_2^{p\prime} = H_2^p P$, $H_2^{p\prime}$ indicating a channel matrix corresponding to the second channel.

7. A data transmission processing method, comprising:

obtaining, by a terminal, an adjustment parameter according to reference signals separately transmitted by a first base station and a second base station;

transmitting, by the terminal, the adjustment parameter to the first base station, so that the first base station performs, according to the adjustment parameter, channel compensation on a first channel between the first base station and the terminal to obtain a second channel;

receiving, by the terminal, a mixed signal of a first signal transmitted by the first base station over the second channel and a second signal transmitted by the second base station;

obtaining, by the terminal, the first signal from the mixed signal, wherein the first signal and the second signal are transmitted by the first base station and the second base station using a same spectrum to the terminal, respectively; and wherein the adjustment parameter comprises $A_1$ and $B_1$ when the terminal has a single antenna, where $A_1$ comprises a difference between a phase of the first channel and a phase of a channel between the second base station and the terminal, and where $B_1$ comprises a ratio of a modulus of the channel between the second base station and the terminal and a modulus of the first channel.

8. The data transmission processing method according to claim 7, wherein a strength of the second signal is greater than that of the first signal.

9. The data transmission processing method according to claim 7, wherein the adjustment parameter comprises $A_1$ and $B_1$, wherein $A_1 = \text{ang}(H_1^m) - \text{ang}(H_1^p)$ and $$B_1 = \min\left(\frac{|H_1^m|}{\gamma|H_1^p|}, 1\right);$$

where $H_1^p$ indicates the first channel, $|H_1^p|$ indicates the modulus of the first channel, $\text{ang}(H_1^p)$ indicates the phase of the first channel, $H_1^m$ indicates the channel between the second base station and the terminal, $|H_1^m|$ indicates the modulus of the channel between the second base station and the terminal, $\text{ang}(H_1^m)$ indicates the phase of the channel between the second base station and the terminal, and $\gamma$ is greater than 1.

10. The data transmission processing method according to claim 9, wherein obtaining the first signal from the mixed signal comprises obtaining, by the terminal, the first signal from the mixed signal according to a minimum distance principle, the mixed signal, and a constellation diagram corresponding to the mixed signal.

11. The data transmission processing method according to claim 7, wherein the adjustment parameter comprises P when the terminal, the first base station, and the second base station comprise K antennas each, wherein K>1 and, wherein $P = A_2 \cdot H_2^m$; $A_2 = \alpha(H_2^p)^{-1}$, or $A_2 = \alpha(H_2^p)^*(H_2^p(H_2^p)^* + \beta I)^{-1}$;

wherein $H_2^m = (H_{2a,b}^m)|_{a=1,2,\ldots,K;b=1,2,\ldots,K}$, $H_2^m$ indicating a channel matrix from the second base station to the terminal, and $H_{2a,b}^m$ indicating a channel from a $b^{th}$ antenna of the second base station to an $a^{th}$ antenna of the terminal;

$H_2^p = (H_{2a,b}^p)|_{a=1,2,\ldots,K;b=1,2,\ldots,K}$, $H_2^p$ indicating a channel matrix corresponding to the first channel, $H_{2a,b}^p$ indicating a first channel from a $b^{th}$ antenna of the first base station to the $a^{th}$ antenna of the terminal, and $(H_2^p)^*$ indicating a conjugate transpose of matrix $H_2^p$; and $\alpha$ is used to ensure that a sum of elements on a diagonal line after matrix P is multiplied by the conjugate transpose of matrix P is smaller than or equal to 1, I indicates a unit matrix, and $\beta$ indicates power of noise on each antenna of the terminal.

12. The data transmission processing method according to claim 11, wherein the obtaining, by the terminal, the first signal from the mixed signal comprises:

processing, by the terminal, the mixed signal into a third signal according to formula 3, wherein formula 3 is $\tilde{Y} = BY$; wherein Y indicates a signal vector of the mixed signal, $\tilde{Y}$ indicates a signal vector of the third signal, and $B = (H_2^m)^{-1}$ or $B = ((H_2^m)^* H_2^m + \beta I)^{-1}(H_2^m)^*$;

obtaining, by the terminal, the second signal from the third signal according to a minimum distance principle, the third signal, and a constellation diagram corresponding to the third signal; and removing, by the terminal, the second signal from the mixed signal to obtain the first signal.

13. The data transmission processing method according to claim 12, wherein the removing, by the terminal, the second signal from the mixed signal to obtain the first signal comprises:

removing, by the terminal and according to formula 4, the second signal from the mixed signal, to obtain the first signal from the mixed signal from which the second signal is removed, wherein formula 4 is $\hat{Y} = Y - H_2^m \tilde{U}_2^m$, wherein $\tilde{U}_2^m$ indicates a signal vector of the second signal obtained by the terminal, and $\hat{Y}$ indicates a signal vector of the mixed signal from which the second signal is removed.

14. A base station, comprising:

a receiving module, configured to receive an adjustment parameter transmitted by a terminal, wherein the adjustment parameter is obtained by the terminal according to reference signals separately transmitted by a first base station and a second base station, and the base station is the first base station;

a channel compensating module, configured to perform, according to the adjustment parameter, channel compensation on a first channel between the first base station and the terminal to obtain a second channel;

a transmitting module, configured to transmit a first signal over the second channel to the terminal, so that the terminal obtains the first signal from a mixed signal of the first signal and a second signal that is transmitted by the second base station, wherein the first signal and the second signal are transmitted by the first base station and the second base station using a same spectrum to the terminal, respectively; and wherein the adjustment parameter comprises $A_1$ and $B_1$ when the terminal has a single antenna, where $A_1$ comprises a difference between a phase of the first channel and a phase of a channel between the second base station and the terminal, and where $B_1$ comprises a ratio of a modulus of the channel between the second base station and the terminal and a modulus of the first channel.

15. The base station according to claim 14, wherein a strength of the second signal is greater than that of the first signal.

16. The base station according to claim 14, wherein the adjustment parameter comprises $A_1$ and $B_1$ when the terminal has the single antenna and comprises P when the terminal, the first base station, and the second base station comprise K antennas each, and the channel compensating module comprises:

a first compensating unit, configured to perform, according to formula 1 comprising $A_1$ and $B_1$, channel compensation on the first channel to obtain a second channel, wherein: formula 1 is $H_1^{P'}=H_1^P \times e^{jA_1} \times B_1$, $H_1^P$ indicating the first channel, and $H_1^{P'}$ indicating the second channel, and $A_1 = \text{ang}(H_1^m) - \text{ang}(H_1^P)$ and $$B_1 = \min\left(\frac{|H_1^m|}{\gamma |H_1^P|}, 1\right),$$

$\gamma$ being greater than 1, $|H_1^P|$ a modulus of the first channel, $\text{ang}(H_1^P)$ indicating a phase of the first channel, $H_1^m$ indicating a channel between the second base station and the terminal, $|H_1^m|$ indicating a modulus of the channel between the second base station and the terminal, and $\text{ang}(H_1^m)$ indicating a phase of the channel between the second base station and the terminal; and a second compensating unit, configured to perform, according to formula 2 comprising P, channel compensation on the first channel to obtain the second channel, wherein formula 2 is $H_2^{P'}=H_2^P P$, $H_2^P$ indicating a channel matrix corresponding to the first channel, $H_2^{P'}$ indicating a channel matrix corresponding to the second channel, and $P=A_2 \cdot H_2^m$; $H_2^m=(H_{2a,b}^m)|_{a=1,2,\ldots,K;b=1,2,\ldots,K}$, $H_2^m$ indicating a channel matrix from the second base station to the terminal, and $H_{2a,b}^m$ indicating a channel from a $b^{th}$ antenna of the second base station to an $a^{th}$ antenna of the terminal; $H_2^P=(H_{2a,b}^P)|_{a=1,2,\ldots,K;b=1,2,\ldots,K}$, $H_{2a,b}^P$ indicating a first channel from a $b^{th}$ antenna of the first base station to the $a^{th}$ antenna of the terminal, and $(H_2^P)^*$ indicating a conjugate transpose of matrix $H_2^P$; and $A_2=\alpha(H_2^P)^{-1}$ or $A_2=\alpha(H_2^P)^*(H_2^P(H_2^P)^*+\beta I)^{-1}$, $\alpha$ being used to ensure that a sum of elements on a diagonal line after matrix P is multiplied by a conjugate transpose of matrix P is smaller than or equal to 1, I indicating a unit matrix, $\beta$ indicating power of noise on each antenna of the terminal; and K>1.

17. A terminal, comprising:

an obtaining module, configured to obtain an adjustment parameter according to reference signals separately transmitted by a first base station and a second base station;

a transmitting module, configured to transmit the adjustment parameter to the first base station, so that the first base station performs, according to the adjustment parameter, channel compensation on a first channel between the first base station and the terminal to obtain a second channel;

a receiving module, configured to receive a mixed signal of a first signal transmitted by the first base station over the second channel and a second signal transmitted by the second base station; and a processing module, configured to obtain the first signal from the mixed signal, wherein the first signal and the second signal are transmitted by the first base station and the second base station using a same spectrum to the terminal, respectively; and wherein the adjustment parameter comprises $A_1$ and $B_1$ when the terminal has a single antenna, where $A_1$ comprises a difference between a phase of the first channel and a phase of a channel between the second base station and the terminal, and where $B_1$ comprises a ratio of a modulus of the channel between the second base station and the terminal and a modulus of the first channel.

18. The terminal according to claim 17, wherein a strength of the second signal is greater than that of the first signal.

19. The terminal according to claim 17, wherein the adjustment parameter comprises $A_1$ and $B_1$ when the terminal has the single antenna and comprises P when the terminal, the first base station, and the second base station comprise K antennas each, and the obtaining module comprises:

a first obtaining unit, configured to obtain $A_1$ and $B_1$ according to the reference signals separately transmitted by the first base station and the second base station, wherein $A_1 = \text{ang}(H_1^m) - \text{ang}(H_1^P)$, and $$B_1 = \min\left(\frac{|H_1^m|}{\gamma |H_1^P|}, 1\right),$$

wherein $H_1^P$ indicates the first channel, $|H_1^P|$ indicates a modulus of the first channel, $\text{ang}(H_1^P)$ channel, $H_1$ indicates a channel between the second base station and the terminal, $|H_1^m|$ indicates a modulus of the channel between the second base station and the terminal, $\text{ang}(H_1^m)$ indicates a phase of the channel between the second base station and the terminal, and $\gamma$ is greater than 1; and/or a second obtaining unit, configured to obtain P according to the reference signals separately transmitted by the first base station and the second base station, wherein $P=A_2 \cdot H_2^m$, wherein $A_2=\alpha(H_2^P)^{-1}$, or $A_2=\alpha(H_2^P)^*(H_2^P(H_2^P)^*+\beta I)^{-1}$;

wherein $H_2^m=(H_{2a,b}^m)|_{a=1,2,\ldots,K;b=1,2,\ldots,K}$, $H_2^m$ indicating a channel matrix from the second base station to the terminal, and $H_{2a,b}^m$ indicating a channel from a $b^{th}$ antenna of the second base station to an $a^{th}$ antenna of the terminal; and $H_2^P=(H_{2a,b}^P)|_{a=1,2,\ldots,K;b=1,2,\ldots,K}$, $H_2^P$ indicating a channel matrix corresponding to the first channel, $H_{2a,b}^P$ indicating a first channel from a $b^{th}$ antenna of the first base station to the $a^{th}$ antenna of the terminal; $(H_2^P)^*$ indicates a conjugate transpose of matrix $H_2^P$; and $\alpha$ is used to ensure that a sum of elements on a diagonal line after matrix P is multiplied by the conjugate transpose of matrix P is smaller than or equal to 1, I indicates a unit matrix, and $\beta$ indicates power of noise on each antenna of the terminal.

20. The terminal according to claim 19, wherein the processing module comprises:
a first processing unit, configured to, when the adjustment parameter comprises $A_1$ and $B_1$, obtain the first signal from the mixed signal according to a minimum distance principle, the mixed signal, and a constellation diagram corresponding to the mixed signal; and
a second processing unit, configured to, when the adjustment parameter comprises P, process the mixed signal into a third signal according to formula 3, wherein formula 3 is $\tilde{Y}=BY$; wherein Y indicates a signal vector of the mixed signal, $\tilde{Y}$ indicates a signal vector of the third signal, and $B=(H_2^m)^{-1}$ or $B=((H_2^m)^*H_2^m+\beta I)^{-1}(H_2^m)^*$;
an obtaining unit, configured to obtain, according to a minimum distance principle, the third signal, and a constellation diagram corresponding to the third signal, the second signal from the third signal generated by the second processing unit; and
a generating unit, configured to remove, from the mixed signal, the second signal obtained by the obtaining unit, to obtain the first signal.

21. The terminal according to claim 20, wherein the generating unit is specifically configured to remove, according to formula 4, the second signal from the mixed signal, to obtain the first signal from the mixed signal from which the second signal is removed, wherein formula 4 is $\hat{Y}=Y-H_2^m\tilde{U}_2^m$, wherein $\tilde{U}_2^m$ indicates a signal vector of the second signal obtained by the terminal, and $\hat{Y}$ indicates a signal vector of the mixed signal from which the second signal is removed.

* * * * *

UNITED STATES PATENT AND TRADEMARK OFFICE
CERTIFICATE OF CORRECTION

PATENT NO.       : 8,638,744 B2                                Page 1 of 1
APPLICATION NO.  : 13/835751
DATED            : January 28, 2014
INVENTOR(S)      : Rui Wang It is certified that error appears in the above-identified patent and that said Letters Patent is hereby corrected as shown below:

In the Claims

In Col. 20, line 45, claim 19, after "ang $(H_i^p)$" insert --indicates a phase of the first--.

In Col. 20, line 45, claim 19, delete "$H^1$" and insert -- $H_i^m$ --.

Signed and Sealed this
First Day of April, 2014

Michelle K. Lee
*Deputy Director of the United States Patent and Trademark Office*